United States Patent
Vanhee et al.

(10) Patent No.: US 12,046,955 B2
(45) Date of Patent: Jul. 23, 2024

(54) METHODS AND SYSTEMS FOR COOLING AN ELECTRIC MACHINE

(71) Applicant: Dana Automotive Systems Group, LLC, Maumee, OH (US)

(72) Inventors: Steven Vanhee, Hooglede (BE); Joachim Druant, Houthulst (BE); Thibault Devreese, Ghent (BE); Carl Trudel, Boucherville (CA); Luke Miller, Montreal (CA); Jaywant S. Pawar, Pune (IN)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 107 days.

(21) Appl. No.: 17/651,230

(22) Filed: Feb. 15, 2022

(65) Prior Publication Data
US 2023/0261536 A1     Aug. 17, 2023

(51) Int. Cl.
H02K 9/193     (2006.01)
H02K 1/32      (2006.01)
H02K 7/04      (2006.01)

(52) U.S. Cl.
CPC .............. *H02K 1/32* (2013.01); *H02K 7/04* (2013.01); *H02K 9/193* (2013.01)

(58) Field of Classification Search
CPC ............ H02K 1/32; H02K 7/04; H02K 9/193
See application file for complete search history.

(56) References Cited

U.S. PATENT DOCUMENTS

| | | | |
|---|---|---|---|
| 5,111,090 A | 5/1992 | Otake et al. |
| 7,508,100 B2 | 3/2009 | Foster |
| 7,576,459 B2 | 8/2009 | Down et al. |
| 7,816,824 B2 | 10/2010 | Jöckel |
| 7,952,240 B2 | 5/2011 | Takenaka et al. |
| 8,169,110 B2 | 5/2012 | Swales et al. |
| 8,536,756 B2 | 9/2013 | Watanabe et al. |
| 8,970,075 B2 | 3/2015 | Rippel et al. |
| 9,148,041 B2 | 9/2015 | Knoblauch |
| 9,680,351 B2 | 6/2017 | Boxberg et al. |

(Continued)

FOREIGN PATENT DOCUMENTS

| | | |
|---|---|---|
| JP | 2012105457 A | 5/2012 |
| JP | 2012105487 A | 5/2012 |

(Continued)

OTHER PUBLICATIONS

WO2021037906A1 English translation (Year: 2023).*

(Continued)

*Primary Examiner* — Christopher M Koehler
*Assistant Examiner* — Viswanathan Subramanian
(74) *Attorney, Agent, or Firm* — McCoy Russell LLP

(57) ABSTRACT

Methods and systems are provided to cool an electric machine. In one embodiment, an electric machine includes a rotor assembly that includes a rotor shaft and a stack of rotor laminations. The rotor assembly further includes one or more nozzles designed to receive pressurized coolant from a rotor shaft coolant passage and deliver the coolant to a set of open coolant channels in the stack of rotor laminations, wherein the set open coolant channels includes outlets that are profiled to direct the coolant towards a groove in a balancing plate that is coupled to the rotor assembly.

18 Claims, 6 Drawing Sheets

(56) References Cited

U.S. PATENT DOCUMENTS

| | | | |
|---|---|---|---|
| 10,177,631 B1 | 1/2019 | Hopkins et al. | |
| 2009/0121562 A1 | 5/2009 | Yim | |
| 2017/0244294 A1 | 8/2017 | Holzmueller | |
| 2018/0205294 A1* | 7/2018 | Manabe | H02K 9/19 |
| 2019/0027987 A1 | 1/2019 | Fröhlich et al. | |
| 2021/0211008 A1* | 7/2021 | Yang | H02K 1/32 |
| 2021/0305876 A1* | 9/2021 | Vanhee | H02K 1/20 |

FOREIGN PATENT DOCUMENTS

| | | | |
|---|---|---|---|
| JP | 2014060857 A | 4/2014 | |
| WO | WO-2021037906 A1 * | 3/2021 | H02K 17/165 |

OTHER PUBLICATIONS

Jackson, S. et al., "Methods and Systems for Oil Cooled Rotor Laminations," U.S. Appl. No. 16/870,656, filed May 8, 2020, 31 pages.

Devreese, T. et al., "Methods and Systems for Oil Cooled Rotor Laminations," U.S. Appl. No. 17/448,190, filed Sep. 20, 2021, 31 pages.

* cited by examiner

METHODS AND SYSTEMS FOR COOLING AN ELECTRIC MACHINE

TECHNICAL FIELD

The present disclosure relates to a cooling system of an electric machine.

BACKGROUND AND SUMMARY

To increase electric motor efficiency and continuous performance in vehicle drive units, motors have made use of cooling systems that direct pressurized oil through closed channels in the rotor assembly. The pressurized oil may be routed through rotor laminations and then delivered to stator end windings. Cooling the stator end windings and rotor core allows the motor's performance and efficiency to be increased.

However, the inventors have recognized several issues with previous motor cooling arrangements. For instance, oil routed through closed channels in the rotor laminations can experience a comparatively high static pressure due to the centrifugal forces on the oil during motor operation. For instance, in certain motors, the oil can reach 40 bar at 15000 revolutions per minute (rpm). This pressurized oil may cause leakage of oil through the laminations and into the air cap, potentially leading to increased drag losses. Further, the pressurized oil may in some cases deform the thin structures of the laminations.

In one example, the issues mentioned above may be addressed by an electric machine which includes a rotor assembly with a rotor shaft and a stack of rotor laminations. The rotor assembly further includes one or more nozzles designed to receive pressurized coolant (e.g., oil) from a rotor shaft coolant passage and deliver the coolant to a set of open coolant channels in the stack of rotor laminations. The set of open coolant channels may include coolant channels that axially extend through the rotor laminations. The set open coolant channels includes outlets that are profiled to direct the coolant towards a groove in a balancing plate. The balancing plate is coupled to the stack of rotor laminations. By delivering the coolant to the open coolant channels in the rotor laminations via the one or more nozzles, a flow of the coolant may be effectively delivered to the coolant channels and mixed with air therein. Further, by routing coolant axially through the rotor laminations, rotor cooling is increased, which may thereby increase the rotor's lifespan and machine performance, more generally. By using open coolant channels that have both coolant and air therein, the pressurization of the coolant in the rotor laminations, caused by centrifugal forces on the coolant, can be substantially reduced. Consequently, the likelihood of coolant leakage and lamination deformation caused by over-pressurized coolant may be significantly reduced (e.g., avoided). Further, the set of open coolant channels includes outlets that are profiled to direct the coolant towards a groove in a balancing plate that is coupled to the rotor assembly. The coolant may then be directed by centrifugal force to one or more coolant channels with outlets positioned at or near an outer perimeter of the balancing plate. The coolant channels direct coolant towards the end windings. By cooling the end windings, motor efficiency is increased and the likelihood of over-temperature conditions that may cause stator degradation is reduced. Further, by cooling the end windings, the electric machine may achieve increased performance with a similar volume and mass as a machine without end winding cooling, thereby boosting machine performance and performance density.

Further in one example, additional air may be introduced into the set of open coolant channels, via a separate air intake passage. Air may be sucked into the passage due to the Coanda effect and then delivered to the coolant channels downstream of the nozzles (e.g., between the shaft and the nozzles). The coolant pumping force in the set of coolant channels is further reduced as a result.

It should be understood that the summary above is provided to introduce in a simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 1-5B are drawn approximately to scale. However, other relative component dimensions may be used, in other embodiments.

DETAILED DESCRIPTION

Figure 1:
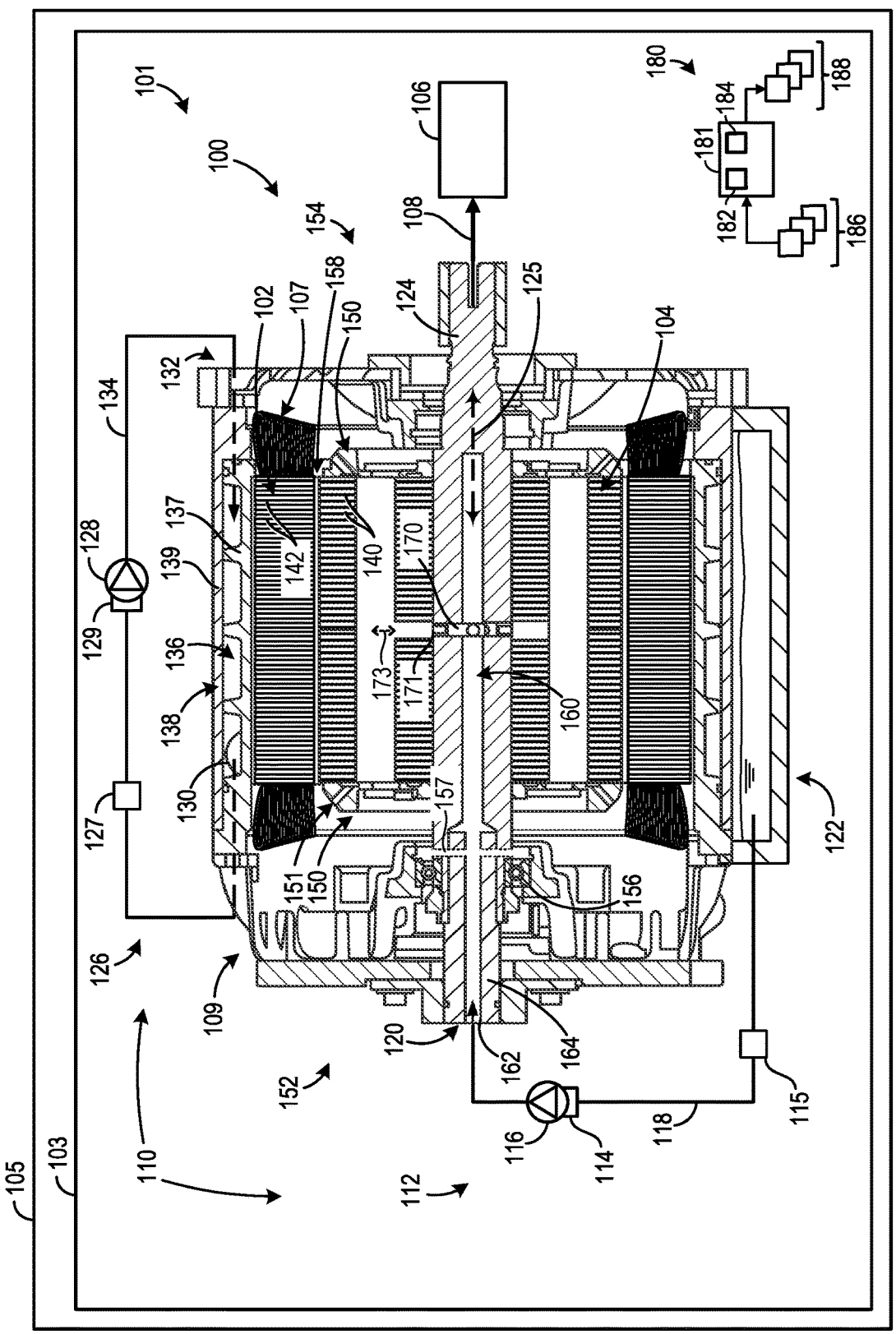
FIG. 1 shows a cross-sectional view of an electric machine with a cooling system.
Figure 4:
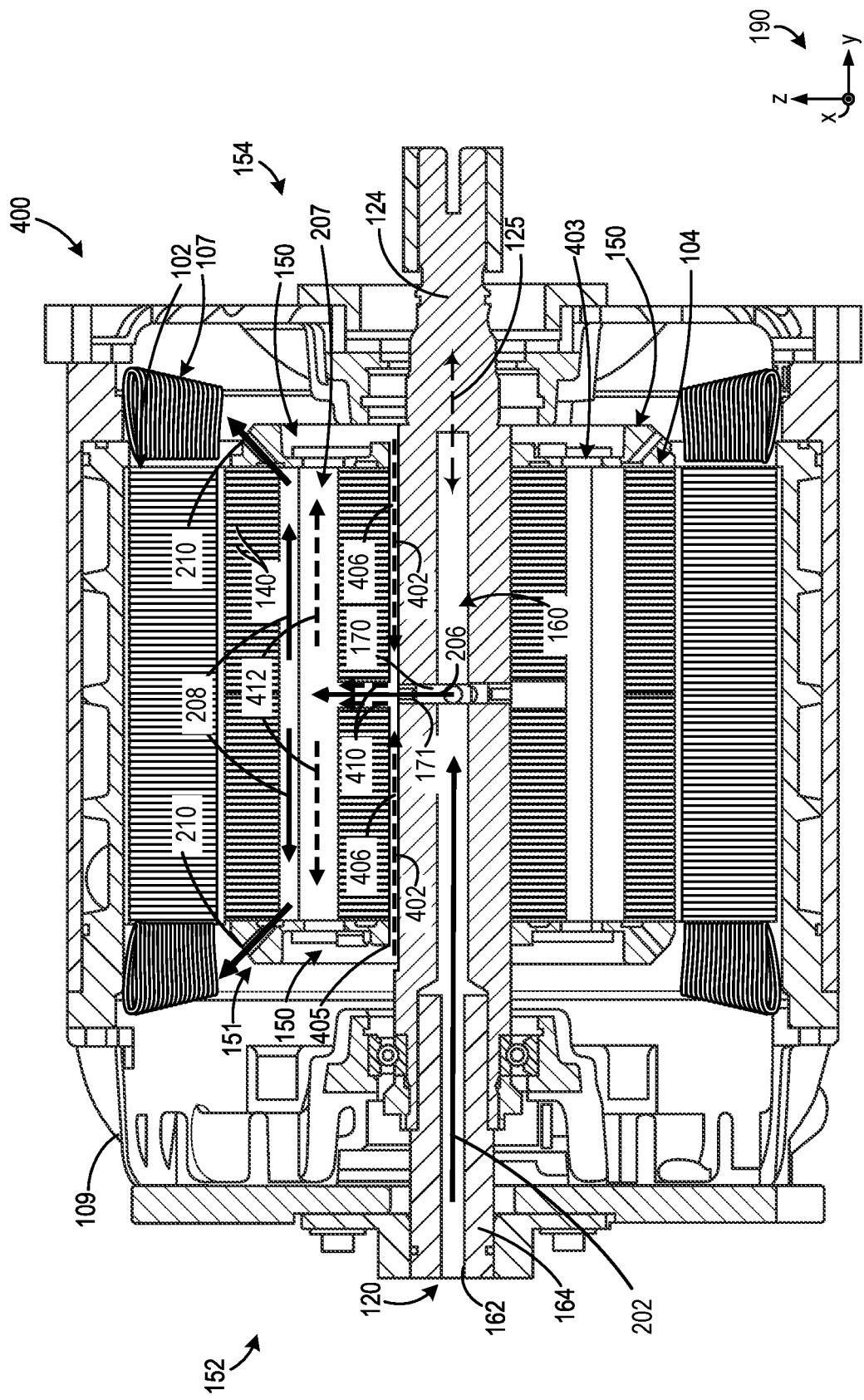
FIG. 4 shows a cross sectional view of another example of an electric machine with a cooling system.
Figure 5A:
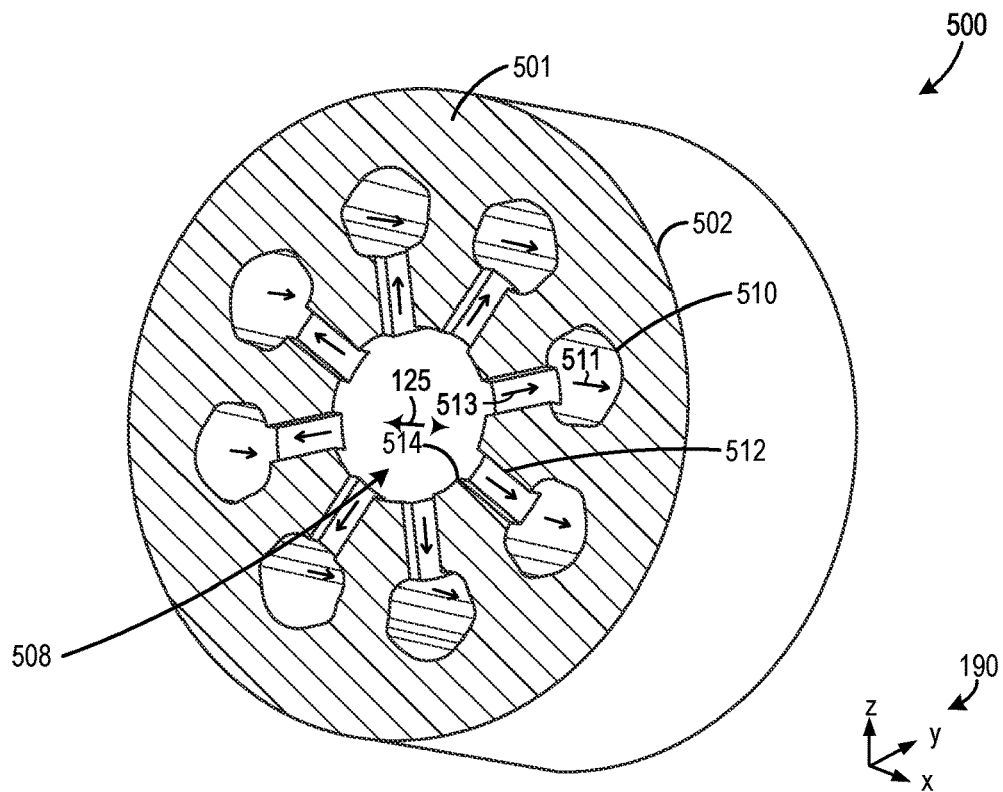
FIG. 5A shows a perspective view of radial channels in a stack of rotor laminations.

The systems and methods described herein relate to an electric machine with a cooling system, such as the electric machine shown in FIG. 1. A coolant (e.g., dielectric coolant) may be flowed from a channel in a shaft of a rotor of the electric machine through components of the electric machine via nozzles arranged on the rotor shaft, along a path indicated in FIG. 2. Centrifugal force generated as a result of rotation of a rotor and a pressure generated by a pump to the electric machine may propel the coolant through a lamination stack of the rotor to be collected in balancing plates, such as the balancing plate shown in FIGS. 3A and 3B. The coolant may be subsequently delivered to end windings of a stator of the electric machine via coolant channels positioned on the balancing plates. Rather than introducing air into the coolant within the rotor shaft, air may be introduced into the coolant downstream of the nozzles via an air passage outside the rotor shaft, as shown in FIG. 4. A cross section of a first design of a lamination stack through which the coolant is flowed is shown in FIG. 5A, and a cross section of a second design of a lamination stack through which the coolant is flowed is shown in FIG.

5B. The pressure of the coolant may be controlled by adjusting an operation of the pump, by performing one or more steps of the method described in FIG. 6.

FIG. 1 shows an electric drive unit 101 with an electric machine 100 (e.g., an electric motor, such as a motor-generator). As such, the electric machine 100 may be designed to generate mechanical power, as well as electric power during a regeneration mode, in some cases. To achieve this functionality, a stator assembly 102 and a rotor assembly 104 are provided within a housing 109. The electric drive unit 101 may additionally include a gearbox, an inverter, and/or other suitable components. In some examples, the electric machine 100 of the electric drive unit 101 may reside in a powertrain system 103 in a vehicle 105 or other suitable system. In such examples, the vehicle may take a variety of forms in different embodiments, such as a light, medium, or heavy duty vehicles. Alternatively, the motor may be used in other suitable systems, such as systems in manufacturing facilities or other industrial settings.

In some examples, in addition to the electric machine 100, the vehicle 105 may further include another motive power source, such as an internal combustion engine (ICE) (e.g., a spark and/or compression ignition engine) or other suitable devices to generate rotational energy. The ICE may include conventional components such as cylinders, pistons, valves, a fuel delivery system, an intake system, an exhaust system, and the like. Thus, the powertrain system 103 and electric machine 100 may be utilized in an electric vehicle (EV) such as a hybrid electric vehicle (HEV) or a battery electric vehicle (BEV).

The electric machine 100 may be designed to provide mechanical power to a downstream component 106 via an output shaft or other suitable mechanical component, represented by arrow 108. The component 106 may be a transmission, a gearbox in an electric axle, a differential, and the like. Alternatively, the electric machine 100 may be used in equipment other than a vehicle. As such, the component 106 may be a pump, compressor, fan, or the like.

FIG. 1 further illustrates a cooling system 110 for the electric machine 100. The cooling system 110 may include a coolant circuit 112 and a water jacket 126 designed for cooling the electric machine. The coolant circuit 112 may be designed to circulate coolant (e.g., natural and/or synthetic oil) through the electric machine. Further, the coolant in the coolant circuit 112 may be fluidly separated from a coolant (e.g., water, a water ethylene glycol mixture, etc.) in a water jacket 126. In some examples, however, the water jacket 126 may be omitted. In such an example, the coolant may be fed to an external water to oil cooler which may be mounted in the powertrain or elsewhere in the vehicle.

The coolant circuit 112 may include a filter 114 and a coolant pump 116. The coolant pump 116 flows coolant through a coolant delivery line 118 and into the housing 109 via a coolant inlet 120. In one example, the coolant pump 116 may be designed to pick up coolant from a coolant sump 122, which is formed within a lower portion of the housing 109. In some examples, the pump 116 and/or the filter 114 may be disposed external to the housing 109 and in fluid communication with the sump 122 and the coolant inlet 120 via coolant lines. However, in other examples, the pump 116 and the filter 114 may be incorporated in the housing. The coolant circuit 112 may further include a heat exchanger 115 (e.g., a radiator) designed for removing heat from the coolant that exits the housing 109. When the heat exchanger is used in the system, the coolant is returned to the housing (via coolant inlet 120) at a lower temperature by the pump 116. However, in other examples, the heat exchanger may be omitted from the system, and the line through which the coolant is transferred and/or the coolant flowing through the coolant circuit 112 may function to remove heat from the electric machine. In one particular example, the coolant inlet 120 may be in fluidic communication with (or formed within) the rotor shaft 124 of the rotor assembly 104. Specifics regarding the routing of coolant through the coolant inlet and rotor assembly will be elaborated on herein with respect to FIGS. 2-6.

The water jacket 126 of the cooling system 110 may be in fluidic communication with a pump 128 that is designed to circulate coolant through the water jacket 126 in the housing 109, from a coolant outlet 130 to a coolant inlet 132 via a coolant delivery line 134. Further, the water jacket 126 may be in fluidic communication with a filter 129 and a heat exchanger (e.g., a radiator) 127. To elaborate, the water jacket 126 may be designed for routing coolant through coolant channels 136 formed between an inner housing portion 137 and an outer housing portion 139 of the housing 109. More specifically, the coolant channels 136 may be located between an inner wall of the outer housing portion 139 and an outer wall of the inner housing portion 137, where at least one of the inner or outer walls of the outer or inner housing portions, respectively, is shaped/sized (e.g., profiled) to form distinct coolant channels therebetween.

The inner housing portion 137 and the outer housing portion 139 may be joined to one another to form the housing 109 and may be constructed out of a similar material or different materials, in different examples. For instance, the inner and/or outer housing portions of the housing 109 may be constructed out of a metal such as steel, aluminum, combinations thereof, and the like. In some examples, the coolant channels 136 may collectively form a spiraling coolant conduit for moving the coolant through the water jacket 138 of the housing 109, where providing a water jacket with spiraling coolant channels may enable a greater heat transfer surface in contact with the coolant flowing therethrough. However, in other examples, the water jacket may include coolant conduits that axially traverse the housing 109 in addition or as an alternative to the spiraling coolant channels. In such an example, the water jacket coolant may be separated from the oil.

The rotor assembly 104 and the stator assembly 102 are disposed within the housing 109, as described above. The rotor assembly 104 and the stator assembly 102 during machine operation electromagnetically interact to rotate a rotor shaft 124, in a motor mode, and generate electrical energy in a regenerative mode, when the machine is designed with regeneration functionality. The rotor assembly 104 includes a stack of rotor laminations 140, which may be designed for allowing a flow of coolant (e.g., oil) and/or air therethrough, as will be elaborated on herein. Further, in the case of a permanent magnet machine, the stack of rotor laminations 140 may include permanent magnets embedded therein. In other examples, the permanent magnets may be surface-mounted on the rotor laminations 140. However, numerous types of rotor stack designs have been envisioned. For instance, the rotor stack may be designed as an interior permanent magnet (IPM) type rotor, a surface permanent magnet (SPM) type rotor, or a Halbach array type rotor. The stator assembly 102 further includes stator laminations 142 (e.g., formed as a stack of laminated plates) and stator laminations with windings wound therethrough which form end windings 107 at the axial sides of the stator assembly. The stator laminations 142 may be constructed out of a metal such as steel (e.g., electrical steel, silicon steel, and the like).

An air gap 158 is formed between the stator assembly 102 and the rotor assembly 104. Specifically, the air gap 158 is formed between the stack of stator laminations 142 and the stack of rotor laminations 140 and extends from opposing axial sides 152, 154 of the stator and rotor stacks. The air gap 158 permits the rotor to rotate and the rotor and stator to electromagnetically interact in a desired manner.

In one particular example, the electric machine 100 may further include one or more balancing plates 150. Specifically, a first balancing plate may be positioned on one axial side 152 of the stack of rotor laminations 140, and a second balancing plate may be positioned on an opposing axial side 154 of the stack of rotor laminations. In such an example, the first and second balancing plates 150 may be attached to the rotor assembly 104 (e.g., the rotor shaft 124 and/or the rotor laminations 140), adjacent to the stack of rotor laminations 140, such that the rotor core is interposed between the balancing plates. In other examples, however, a single balancing plate may be positioned on one side of the stack or rotor laminations.

The balancing plates may be coupled to the rotor assembly via bolts, screws, other suitable attachment devices, welds, adhesive(s), press-fitting, combinations thereof, and the like. Further, the balancing plates fixate and retain the stack of rotor laminations 140 to the rotor shaft 124. As such, the balancing plates serve to fine tune the rotor's rotational mass balance to reduce the chance of rotational imbalances that may reduce motor efficiency and/or lead to premature degradation of motor components, in some cases. Coolant may flow through the balancing plates 150, for example, to cool the end windings 107 via coolant conduits 151 which are in fluidic communication with a collector cavity. The flow of coolant as well as air through the balancing plates 150 and the laminations 140 of the rotor assembly 104 are elaborated upon herein, with respect to FIGS. 2-5B.

During machine operation, the rotor shaft 124 of the rotor assembly 104 rotates about an axis 125 and permits rotational energy to be transferred from the electric machine 100 to an external component 106. The external component 106 may be a shaft in a gearbox, a driveshaft, and the like when the machine is used in a vehicle. However, numerous suitable types of components that attach to the electric machine have been contemplated.

The balancing plates 150, which will be discussed in greater detail herein, also rotate about the axis 125. The rotational axis 125 is additionally provided in FIGS. 2-5B for reference. Bearings 156 may be coupled to the rotor shaft 124 to support the shaft and facilitate rotation thereof. The bearings 156, and any other bearings described herein, may include inner and outer races and roller elements (e.g., spherical balls, cylinders, tapered cylinders, and the like).

The rotor shaft 124 may further include coolant channels (e.g., closed coolant channels) designed to route coolant through various components of the electric machine 100, particularly through the stack of rotor laminations 140 and bearings in the rotor assembly 104. Specifically, the rotor shaft 124 may include a coolant channel 160 for axially routing coolant into the electric machine 100 from the pump 116. To elaborate, the coolant channel 160 may include an opening 162 at one end of the rotor shaft that functions as the coolant inlet 120. In some examples, the coolant inlet 120 may be a hollow tube (e.g., cylindrical tube) 164 that extends into the rotor shaft 124.

In one example, the bearings 156 may be lubricated via conduits 157 that branch off of the coolant channel 160. Specifically, oil may be directed to the inner races of the bearings 156 to increase the lifespan and reduce thermal degradation of the bearing material. In this way, the system can achieve dual-use functionality, decrease bearing wear, and increase machine efficiency. Further still in other embodiments, additional or alternative oil conduits may branch off of the channel 160 such as a conduit that extends to a gear and/or a clutch in a gearbox, for instance.

Channels 170, in the rotor shaft 124, may radially or angularly branch off of the coolant channel 160 and deliver coolant to nozzles 171 that may be positioned within the rotor shaft 124. Each of the channels 170 may specifically include a nozzle, in one example. Positioning the nozzles in the rotor shaft (near the rotational axis 125 of the machine), decreases the effect of nozzle rotation on coolant flowrate therethrough. As a result, the coolant flow through the nozzles may be more accurately controlled via the pump 116.

The number of nozzles, the size of the nozzles, and/or the radial location of the nozzles along channels 170 may be selected to achieve a desired pump effect on the coolant during machine operation and therefore a desired coolant flowrate. For instance, the further radial outward the nozzles are positioned, the greater coolant pumping effect is generated. Further, the channels 170 may be located near a mid-point 173 of the rotor assembly 104. Further details of the flow of coolant through the rotor shaft 124, the nozzles 171, and through the stack of rotor laminations 140 and the balancing plates 150 towards the stator end windings 107 and other components of the electric machine 100 will be elaborated upon herein with reference to FIGS. 2-6.

A control system 180 with a controller 181 may further be included in the electric machine system. The controller may include a processor 182 and memory 184 with instructions stored therein that, when executed by the processor, cause the controller to perform various methods and control techniques described herein. The processor may include a microprocessor unit and/or other types of circuits. The memory may include known data storage mediums, such as random access memory, read only memory, keep alive memory, combinations thereof, and the like.

The controller 181 may receive various signals from sensors 186 positioned in the system 103 and the electric machine 100. Conversely, the controller 181 may send control signals to various actuators 188 at different locations in the system based on the sensor signals. For instance, the controller 181 may send command signals to the coolant pump 116 and/or the pump 128, and, in response, the actuators in the pumps may be adjusted to alter the flowrate of the coolant delivered therefrom. In other examples, the controller may send control signals to an inverter coupled to the electric machine 100 and in response to receiving the command signals, the inverter may be adjusted to alter electric machine speed. Other controllable components in the system may be operated in a similar manner with regard to sensor signals and actuator adjustment.

An axis system 190 is provided in FIG. 1, as well as in FIGS. 2-5B, for reference. The z-axis may be a vertical axis (e.g., parallel to a gravitational axis), the x-axis may be lateral axis (e.g., a horizontal axis), and/or the y-axis may be a longitudinal axis, in one example. However, the axes may have other orientations, in other examples.

Figure 2:
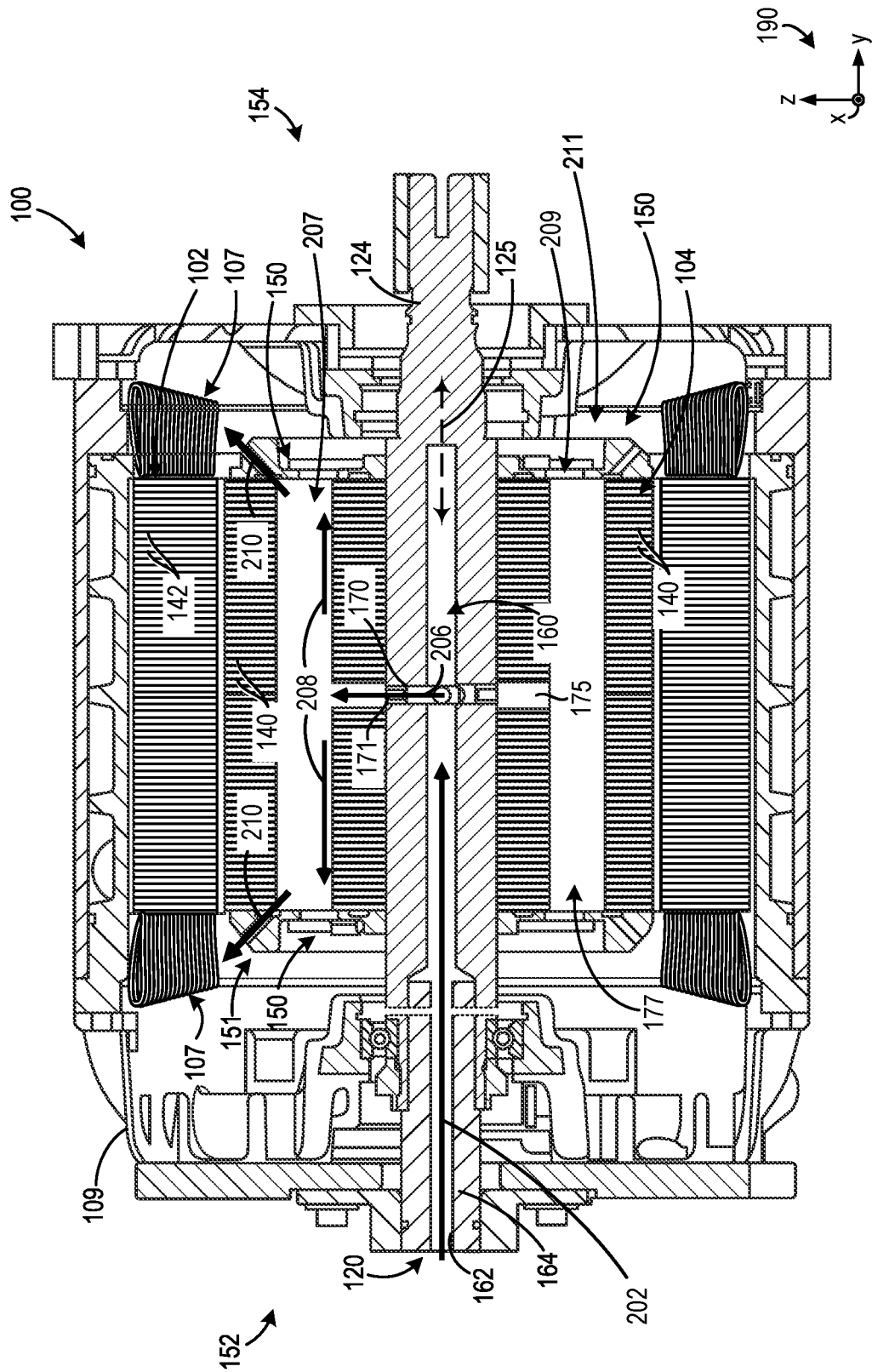
FIG. 2 shows the cross-sectional view of the electric machine depicted in FIG. 1, further illustrating a coolant flow path through the electric machine.

Referring now to FIG. 2, a cross-sectional view of the electric machine 100 is shown, further illustrating a path of coolant flow through the electric machine 100. Coolant may enter into the electric machine 100 via the coolant inlet 120 of the coolant channel 160 of the rotor shaft 124, as indicated by an arrow 202 and as described above in reference to FIG. 1. The coolant may flow in the direction indicated by the arrow 202 to the radial channels 170, which may direct the coolant in a direction marked by an arrow 206 through the stack of rotor laminations 140. The coolant may pass from the radial channels 170 to axial coolant channels 207 which are axially aligned with the rotor shaft 124. In these channels, the coolant may be directed towards opposing axial sides 152 and 154 of the rotor assembly in the direction of arrows 208.

The flow of coolant may pass through the nozzles 171 (e.g., orifice plugs and the like). The nozzles may be arranged at an intersection of the radial channels 170 and open radial coolant channels 175. The open radial coolant channels 175 are included in a set of open coolant channels 177 in the rotor assembly 104. By positioning the nozzles in the rotor shaft 124 near the rotational axis 125, the oil flow is less dependent on rotor speed, when compared to nozzles that are positioned further radially outward. Consequently, the pump 116 may more effectively adjust the coolant flowrate. However, it will be understood that positioning the nozzles radially outward from the rotor's rotational axis allows the rotor shaft to act like a pump. As such, the flowrate through the rotor may exceed the peak flowrate of the pump at static conditions, if wanted. Therefore, the radial location of the nozzles may be selected to achieve a desired amount of pumping action, in some scenarios.

The nozzles 171 function as flow restrictions and allow the flow of coolant into the set of open coolant channels to be tuned to achieve a desired flowrate. Moreover, the use of the nozzles allows oil to be introduced into the open flow channel and mix with air therein.

The flow of coolant through the nozzles 171 may be controlled by a pump (e.g., pump 116 of FIG. 1), as described above, based on operating conditions such as machine temperature, machine speed, ambient temperature, and the like. The pressure of the coolant in the coolant channels 207 may be controlled by the pump, to ensure that the pressure of the coolant in the axial coolant channels 207 is maintained within a target pressure range. However, in other examples, the pump may be configured to deliver coolant to the coolant channel 160 at a set flowrate.

The open radial coolant channels 175 may be sized to reduce (e.g., avoid) pumping effects in the laminations caused by rotor rotation. For instance, the radial channels may have a diameter that is approximately five times larger than the diameter of the nozzles 171 (e.g., orifices)}, in one use-case example. However, other relative coolant channel and orifice dimensions may be used, in other examples. In another embodiment, the radial coolant channels 175 may be replaced via a cylindrical spacer between two parts of the rotor lamination stack. As such, disc shaped channels may be formed that are hydraulically connected with the rotor nozzles and the axial channels in the rotor laminations.

From the open radial coolant channels 175, coolant may flow into axial coolant channels 207 that may also be included in the set of open coolant channels 177. The axial coolant channels 207 may extend in one or both axial directions toward the sides of the rotor assembly 104 and specifically towards the balancing plates 150.

Upon reaching axial sides 152 and 154, the coolant may be expelled or otherwise directed towards grooves in the balancing plates 150. These grooves are discussed in greater detail herein with regard to FIG. 3B. The coolant may then be sprayed or otherwise directed by coolant conduits 151 in the balancing plates 150, in a direction indicated by an arrows 210, to the end windings 107 of the stator assembly 102. The routing of coolant to the conduits via the grooves of the balancing plate 150 is described in greater detail below in reference to FIGS. 3A and 3B.

Openings 209 in the balancing plates 150 may be used to introduce air into the axial coolant channels 207. This air may be drawn from a cavity 211 within the interior of the electric machine 100. In this way, a mix of air and coolant (e.g., oil) can be formed in the set of open coolant channels 177. The pressure in the open coolant channels is therefore decreased when compared to closed channels while allowing coolant to flow therethrough. The machine may therefore achieve desired cooling characteristics while decreasing the chance of coolant leakage through the rotor assembly and degradation to the rotor laminations caused by high pressure coolant, in some cases.

Figure 3A:
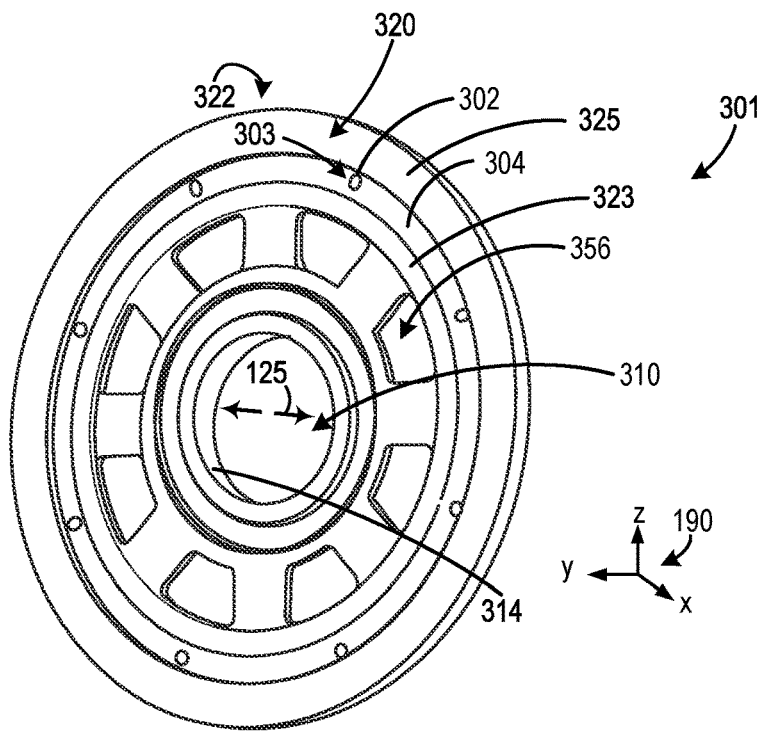
FIG. 3A shows a perspective view illustrating a first side of an exemplary balancing plate for an electric machine.

Referring now to FIG. 3A, a first, inner side of an exemplary balancing plate 301 for an electric machine, such as the electric machine 100 of FIG. 1, is illustrated. The balancing plate 301 may be a non-limiting embodiment of a balancing plate 150 of FIG. 1. The first, inner side faces a rotor lamination stack, such as the stack of rotor laminations 140 described in reference to FIGS. 1 and 2. Balancing plate 301 may function to retain the rotor lamination stack, as well as balance the lamination stack to ensure a smooth rotation of a rotor assembly of the electric machine during operation of the electric machine.

A rotor shaft of the rotor assembly may be coupled to the balancing plate 301 at a central aperture 310 of the balancing plate 301, where the rotor shaft may be coaxially aligned with the balancing plate 301 along the axis 125. The balancing plate 301 may have an inner perimeter 314 adjacent to the rotor shaft and an outer perimeter 306 of the balancing plate 301, which may be aligned with an outer surface of the rotor lamination stack. The outer perimeter 306 and the outer surface of the rotor lamination stack may be separated from components of a stator assembly of the electric machine. In particular, the outer perimeter 306 of the balancing plate 301 may rotate proximate to end windings of the stator assembly (e.g., end windings 107). As such, a coolant may be delivered to the end windings through the balancing plate 301.

As the rotor assembly rotates during operation of the electric machine, coolant may be delivered to components of the rotor assembly and the stator assembly as described above in reference to FIG. 2. Specifically, pressurized coolant may flow from a coolant channel inside the rotor shaft to the rotor lamination stack via radial coolant channels (e.g., the radial channels 170 of FIG. 2), and may subsequently be directed axially towards the balance plate assembly 301 via an axial coolant channels 207, shown in FIG. 2. The coolant from these axial coolant channels may be directed into in a groove 304 (e.g., an angular groove) of the balance plate assembly 301 by centrifugal force generated by the rotation of the rotor assembly. The coolant flow induced via centrifugal forces occurs in both clockwise and counterclockwise rotational directions. Thus, the coolant flow induced via centrifugal forces may be independent from the direction of rotor rotation. The groove 304 may extend across an outlet of the axial coolant channels adjacent to an outer radial periphery of the channels. A section 323 of the balancing plate, positioned radially inward from the groove 304 may further aid in the collection of coolant in the groove. To elaborate, the section 323 of the balancing plate 301 positioned radially inward from the groove 304 may overlap a portion of the outlets of the axial coolant channels in the rotor assembly and function to direct coolant into the groove. Further, the groove 304 may be axially recessed from the section 323 and an outer section 325 of the balancing plate 301. Thus, the balancing plate may serve as a catch plate for the coolant.

Figure 3B:
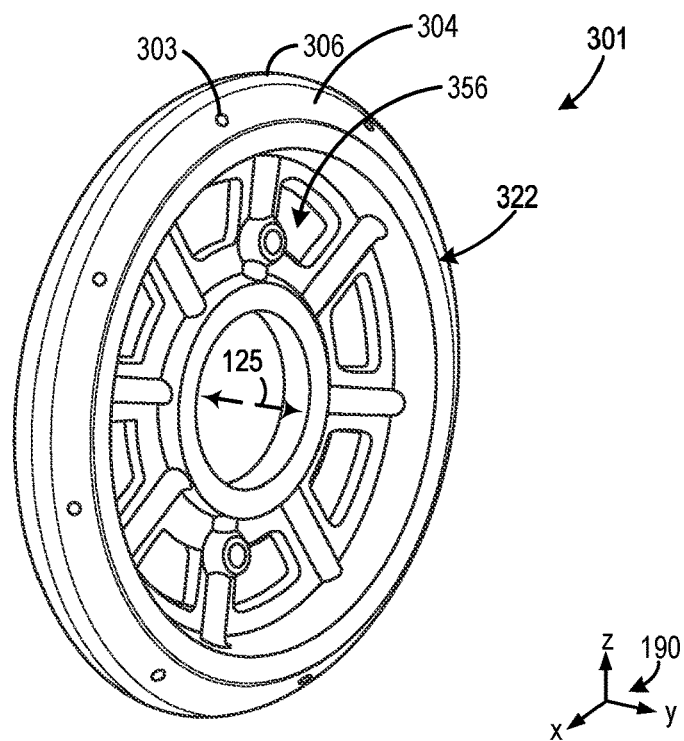
FIG. 3B shows another perspective view illustrating a second side of the balancing plate depicted in FIG. 3A.

As the coolant is collected in the groove 304, the coolant may be directed into inlets 302 of coolant conduits 303 that extend from a first axial side 320 of the balancing plate 301 to coolant conduits 303, shown in FIG. 3B, positioned on a second axial side 322 of the balancing plate. The angular groove 304 may circumferential extend around the plate, allowing a greater amount of coolant to be collected therein when compared to grooves that are segmented.

The coolant conduits 303 may be profiled to deliver (e.g., spray) the coolant to the end windings of the stator assembly at a target flowrate. This coolant flow may be generated via centrifugal forces due to rotation of the balancing plate. It will be appreciated that the coolant conduits 303 may extend axially and/or radially outward through the balancing plate.

FIG. 3B shows a perspective view of the second axial side 322 of the exemplary balancing plate 301 with the conduits 303. To expound, the conduits 303 may be positioned at or adjacent to an outer perimeter 306 of the balancing plate 301.

It will be appreciated that the coolant flow through the balancing plate may unfold as follows: coolant may be collected in the groove 304, shown in FIG. 3A, and then travel into the coolant conduits 303. From the coolant conduits 303, shown in FIG. 3A and shown in FIG. 3B, and then is expelled towards the end windings. Coolant exiting the coolant conduits 303 and cooling the end windings may ultimately drain into a coolant sump (e.g., the coolant sump 122 of FIG. 1), where the coolant may be pumped back into the rotor assembly via the rotor shaft to complete a lubrication circuit.

The coolant conduits 303 may be positioned at regular intervals around the groove 304 to ensure that coolant does not pool at areas of the groove 304. Additionally, a number of the coolant conduits may vary depending, for example, on a desired coolant flowrate or flowrate range at which the coolant is directed (e.g., sprayed) at the end windings to ensure adequate lubrication of the end windings, a desired rate of flow of the coolant through the rotor laminations, and/or other factors.

The balancing plate 301 may also include one or more openings 356 that function as air passage intakes. As described above, air may enter the set of open coolant passages via the openings 356 in the balancing plate 301. Thus, the openings 356 may function as air intakes for the open coolant passages in the rotor assembly. To elaborate, air may flow through the openings and then into the outlets of the axial coolant channels. By allowing air to enter the rotor assembly in this manner, the air may be combined with the coolant after it exits the nozzles, thereby reducing the coolant pressure in the coolant passages. Consequently, the chance of coolant leakage and in some cases lamination degradation is reduced.

Referring now to FIG. 4, a cross-sectional view of another embodiment of an electric machine 400 is illustrated. The electric machine 400 and the electric machine 100 depicted in FIG. 1 include overlapping components with similar structures and/or functionalities. These overlapping components are similarly numbered and redundant description is omitted for brevity. However, as shown in FIG. 4, the electric machine 400 includes air passages 402 that route air into the rotor laminations 140. The flow of coolant through the electric machine 100 described above in reference to FIG. 2 is also depicted in FIG. 4 with the solid arrows 202, 206, 208, and 210.

In the embodiment depicted in FIG. 4, air may enter into the rotor assembly 104 from openings 403 in the balancing plates 150 and then into inlets 405 of the air passages 402. The air passages 402 may extend axially toward the radial coolant channels 175 from one or both axial sides of the rotor assembly 104. Specifically, in one examples, the air passages 402 may be arranged axially along an outer perimeter of the rotor shaft 124, as indicated by a dashed arrow 406. The air may flow in the direction indicated by the arrows 406 until intersecting with one or more radial coolant channels 170, described above in reference to FIGS. 1 and 2.

As coolant flows from the coolant channel 160 through the radial channels 170 in the direction marked by the arrow 206 (e.g., through the nozzles 171), the air entering electric machine 100 via air passages 402 may combine with the coolant at the one or more radial channels 170, as indicated by the arrows 410. In various embodiments, the air may be drawn into the air inlets 405 and down air passages 402 due to the Coanda effect, as the pressurized coolant exits the nozzles 171. In this way, the coolant pumping force of the system is further reduced.

In other embodiments, the air may be actively pumped into the set of coolant channels. The mixture of air and coolant may be directed to the axial sides 152 and 154 of the electric machine 100 through the plurality of coolant channels 207, which forms a passage between the stack of rotor laminations 140, in the axial directions indicated by the arrows 412.

By arranging the air passages 402 outside the rotor shaft 124, air may be combined with the coolant after the coolant passes through the nozzles 171, as opposed to introducing air into the coolant at or prior to the coolant channel 160, as is shown in FIG. 1. By routing primarily coolant through the coolant channel 160, the flow of coolant through electric machine 100 may be precisely controlled by a pump (e.g., pump 116 of FIG. 1) and in some cases routed to other machine components such as bearings, gears, and the like, as previously discussed.

Turning now to FIG. 5A, a perspective view of a portion of a rotor lamination stack 500 of a rotor assembly of an electric machine is shown. The rotor lamination stack 500 may be a non-limiting embodiment of the stack of rotor laminations 140 described above in reference to the electric machine 100 of FIG. 1. The rotor lamination stack 500 may include multiple adjacent rotor laminations 501, each rotor lamination 501 coaxially aligned around a central aperture 508 through which a rotor shaft of the rotor assembly may extend along the axis 125.

The set of rotor laminations shown in FIG. 5A may be included near the axial mid-point of the rotor assembly. Each rotor lamination 501 may include axial coolant channels 510, which may be aligned circumferentially in a ring around the central aperture 508 and coaxially aligned with the rotor shaft in the electric machine (e.g., along axis 125). Arrows 511 depict the general direction of fluid flow through the axial coolant channels 510. Arrows 513 depict the general direction of fluid flow through the radial coolant channels 512. The channels 510 of the rotor lamination 501 may be spaced such that each channel 510 is equidistant from an adjacent channels 510 on either side. Further, the channels 510 may be arranged such that the channels are equidistant or close to equidistant from an outer perimeter (e.g., at the first outer perimeter point 502) and an inner perimeter 514 of the rotor lamination 501.

The axial coolant channels 510 are in fluidic communication with radial coolant channels 512. As discussed above, the radial coolant channels 512 may receive coolant from nozzles in rotor shaft. The radial coolant channels 512 specifically extend from a central aperture 508 to the axial coolant channels 510. As illustrated, the number of radial coolant channels may be equal to the number of axial coolant channels. However, in other embodiments, the number of radial coolant channels may be less than the number of axial coolant channels or vice versa. Further, the widths of the radial coolant channels may be substantially equivalent to avoid rotational imbalances in the rotor assembly.

Figure 5B:
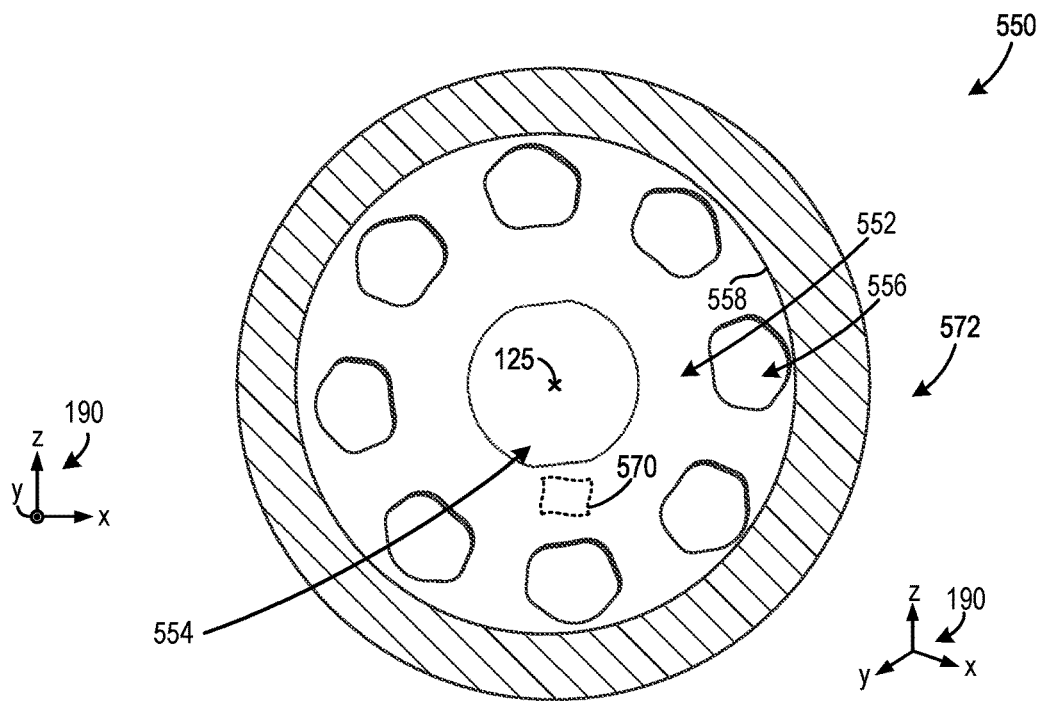
FIG. 5B shows an axial view of angular channels in a stack of rotor laminations.

FIG. 5B shows a perspective view of a rotor lamination stack 550 of a rotor assembly of an electric machine, where the rotor lamination stack 550 has an alternative design from rotor lamination stack 500. In the alternative design of rotor lamination stack 550, one or more angular coolant channels 552 may be formed in the lamination stack. The angular coolant channels are in fluidic communication with the axial coolant channels 556 and distribute coolant thereto during machine operation. These angular channels may specifically form a non-perpendicular angle with the rotational axis 125. The angular channels 552 depicted in FIG. 5B may be specifically formed via a cavity that allows coolant to flow from a central opening 554 and outward, at an angle, toward the axial coolant channels 556 as well as flow circumferentially between the axial coolant channels. The channels 552 may be bounded at an outer circumference via a lip 558 in the lamination stack. Further, the number of angular coolant channels may be less than the number of axial coolant channels, thereby expanding design flexibility. Further, during rotor transients (acceleration, deceleration) the angular coolant channel automatically distribute the oil across all axial channels, decreasing the likelihood of disproportionate oil distribution. Further, in one example, a spacer (e.g., cylindrical spacer), schematically depicted at 570, may be positioned between two section of the laminations (e.g., near the axial center of the lamination stack) to create the angular coolant channel, thereby increasing the efficiency of assembling the lamination stack. The first section of the stack is depicted at 572 and a second similar section may be positioned on the other side of the spacer 570. However, other techniques for forming the angular coolant channel have been contemplated.

Figure 6:
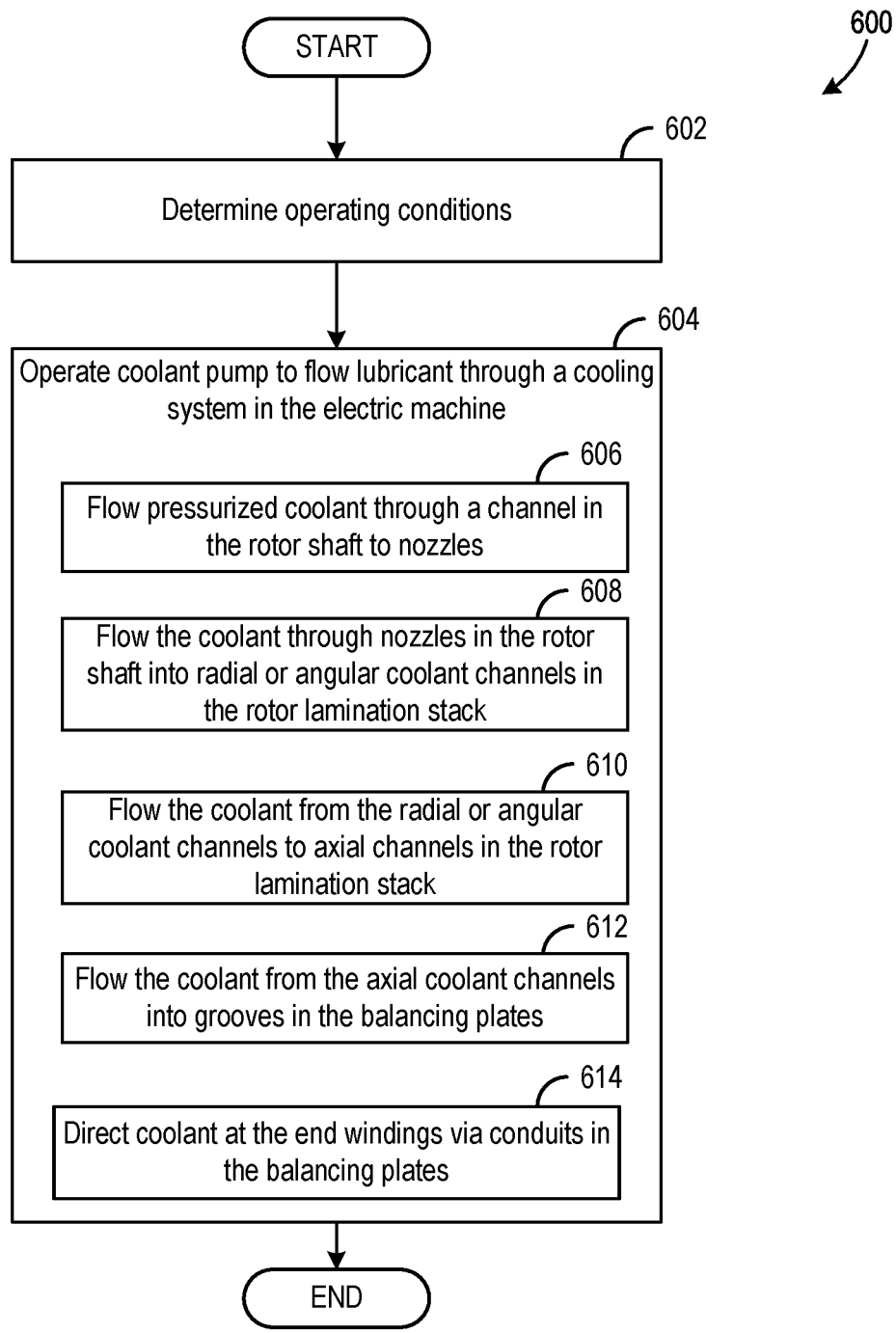
FIG. 6 shows a flowchart illustrating an exemplary method for controlling a flow of coolant through an electric machine.

Referring now to FIG. 6, a method 600 is shown for controlling a cooling system in an electric machine (e.g., the electric machine 100 shown in FIG. 1). In various embodiments, the flow of the coolant may be generated via the operation of a pump (e.g., pump 116). The pressure may also be partially controlled by one or more nozzles (e.g., the nozzles 171 of FIGS. 2 and 4) positioned in rotor shaft coolant channels. Some of the steps of method 600 may be stored as instructions in a memory of a controller, and executed by a processor of the controller (e.g., processor 182 and memory 184 of controller 181 of FIG. 1) while other steps may be passively implemented.

Method 600 begins at 602, where method 600 includes determining operating conditions of the electric machine. For example, the operating conditions may include, but are not limited to, a speed of a rotor of the electric machine, a state of charge (SOC) of an energy storage device (e.g., a battery), coolant temperature, coolant flowrate, winding temperature, and the like. These operating conditions may be measured via sensors and/or estimated via modelling. The operating conditions may further include vehicle operating conditions of a vehicle coupled to the electric machine. For example, the operating conditions may include an engagement of one or more gears of a transmission of the vehicle, a torque applied at one or more wheels of the vehicle, or a different operating condition. In one example, the vehicle is a hybrid electric vehicle, and estimating and/or measuring vehicle operating conditions includes determining whether the vehicle is being powered by an engine or an electric motor. The operating conditions may be measured by sensors of the electric machine and/or vehicle, such as a rotor speed sensor, temperature sensors, depth sensors, and/or other sensors.

At 604, method 600 includes operating a coolant pump to flow coolant through the cooling system in the electric machine. The coolant pump may be positioned external to the electric machine, as described above in reference to FIG. 1. The pump may draw coolant from a coolant sump (e.g., coolant sump 122) of the electric machine, and propel the coolant into a rotor assembly of the electric machine. Further, the flowrate of the coolant delivered by the pump to the coolant circuit, may be adjusted based on one or more of the operating conditions determined in step 602.

Step 604 may include boxes 606-614. At 606, the method includes flowing pressurized coolant through a channel in the rotor shaft to nozzles in the rotor shaft. Next at 608, the method includes flowing the coolant from the nozzles into radial or angular coolant channels in the rotor lamination stack. As discussed above, the radial or angular coolant channels are included in a set of open coolant channels in the lamination stack. In this way, coolant may travel from closed coolant channels to open coolant channels. The use of open coolant channels that allow air to flow therein enables the pressure of the coolant flowing therethrough to be reduced, when compared to closed channels that have primarily coolant flowing therethrough. The static pressure of the coolant is specifically reduced. The air may enter the set of coolant channels in the opening where the coolant is expelled towards the balancing plate and/or via air passages that axially traverse the rotor laminations.

At 610, the method includes flowing the coolant from the radial or angular coolant channels into axial coolant channels in the lamination stack. Next at 612, the method includes flowing coolant from the axial coolant channels into grooves in the balancing plates. At 614, the method includes directing coolant at the end windings vis conduits in the balancing plates. It will be appreciated that passages, extending through the balancing plates, allows coolant from the grooves in the balancing plate to be distributed to the conduits. In this way, the stator's end windings are efficiently cooled while reducing the static pressure of the coolant and in turn reducing the likelihood of coolant leakage and rotor lamination deformation.

The technical effect of controlling a flow of coolant through a rotor assembly of an electric machine via nozzles that expel coolant into open passages in the rotor laminations is to reduce the static pressure of the coolant in the laminations, when compared to closed coolant channels, while achieving end winding cooling capabilities. The reduction in static pressure of the coolant reduces the chance of coolant leaks from the rotor laminations and rotor lamination degradation. Further, using a mix of air and coolant in the coolant channels may allow a coolant film to be formed on the channels, which may increase rotor cooling.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric machine is provided that comprises a rotor assembly that includes: a rotor shaft; a stack of rotor laminations; and one or more nozzles designed to receive pressurized coolant from a rotor shaft coolant passage and deliver the coolant to a set of open coolant channels in the stack of rotor laminations, wherein the set of open coolant channels includes outlets that are profiled to direct the coolant towards a groove in a balancing plate that is coupled to the rotor assembly.

In another aspect, a method for operating an electric machine is provided that comprises operating a pump to flow pressurized coolant through one or more nozzles into a set of open coolant channels in a stack of rotor laminations; wherein the electric machine includes: a balancing plate coupled to the stack of rotor laminations and including a plurality of coolant conduits that are in fluidic communication with a groove in a balancing plate and direct the coolant towards end windings of a stator of the electric machine. In one example, the method may further comprise adjusting the flow of coolant from the pump based on electric machine operating conditions.

In yet another example, an electric machine is provided that comprises a rotor assembly that includes: a rotor shaft; a stack of rotor laminations; and one or more nozzles designed to receive pressurized oil from a pump and deliver the oil to a set of open oil channels in the stack of rotor laminations to form a mixture of oil and air; wherein the set of open oil channels includes outlets that are profiled to direct the oil towards a groove in a balancing plate that is coupled to the rotor assembly; and wherein the balancing plate includes a plurality of oil conduits in fluidic communication with the groove that direct the oil towards end windings of a stator of the electric machine.

In any of the aspects or combinations of the aspects, the balancing plate may include a plurality of coolant conduits in fluidic communication with the groove that direct the coolant towards end windings of a stator of the electric machine.

In any of the aspects or combinations of the aspects, the groove may circumferentially extend around the balancing plate; and the plurality of coolant conduits may extend from an inner axial side of the balancing plate to an outer axial side of the balancing plate.

In any of the aspects or combinations of the aspects, the set of open coolant channels may include a plurality of radial channels extending from the one or more nozzles to a plurality of axial coolant channels in the stack of rotor laminations.

In any of the aspects or combinations of the aspects, the set of open coolant channels may include one or more angular channels extending from the one or more nozzles to a plurality of axial coolant channels through the stack of rotor laminations.

In any of the aspects or combinations of the aspects, a number of the one or more angular channels may be less than a number of axial coolant channels in the plurality of axial coolant channels.

In any of the aspects or combinations of the aspects, the rotor assembly may include one or more air passages that extend through the stack of rotor laminations and open into one or more coolant channels of the set of open coolant channels downstream of the one or more nozzles.

In any of the aspects or combinations of the aspects, the one or more air passages may extend axially through the stack of rotor laminations from one or more respective air passage intakes positioned at one or more axial sides of the stack of rotor laminations.

In any of the aspects or combinations of the aspects, the one or more air passages are positioned radially inwards from a plurality of axial coolant channels of the set of open coolant channels.

In any of the aspects or combinations of the aspects, the one or more nozzles may be positioned in the rotor shaft.

In any of the aspects or combinations of the aspects, the coolant may be oil.

In any of the aspects or combinations of the aspects, at outlets of the one or more nozzles the coolant may mix with air and flow into a plurality of axial coolant channels that extend axially through the stack of rotor laminations.

In any of the aspects or combinations of the aspects, the set of open coolant channels may include a plurality of radial coolant channels and a plurality of axial coolant channels; and the axial coolant channels may receive air from an interior cavity of the electric machine.

In any of the aspects or combinations of the aspects, the set of open oil channels may include a plurality of radial channels extending from the one or more nozzles to a plurality of axial oil channels through the stack of rotor laminations; and the plurality of axial oil channels may receive air from a cavity in the electric machine.

In any of the aspects or combinations of the aspects, the rotor assembly may include one or more air passages that extend through the stack of rotor laminations and open into one or more oil channels of the set of open oil channels downstream of the one or more nozzles and are positioned radially inward from a plurality of axial oil channels of the set of open oil channels.

In any of the aspects or combinations of the aspects, the set of open oil channels includes a plurality of angular oil channels that extend from the one or more nozzles to a plurality of axial oil channels through the stack of rotor laminations.

In any of the aspects or combinations of the aspects, a number of the one or more angular oil channels may be less than a number of axial oil channels.

In another representation, an electric motor generator in a vehicle propulsion unit is provided that includes a closed oil passage routed through a rotor shaft that includes a plurality of nozzles which spray oil into open conduits to form a mixture of air and oil, wherein the open conduits include openings at opposing ends of a rotor assembly that expel oil towards a balancing plate and allow air to enter the open conduits.

Note that the example control routines included herein can be used to control various electromagnetic propulsion units with various electric machine, and/or drive system configurations. At least some of the manufacturing and/or control method steps disclosed herein may be stored as executable instructions in non-transitory memory and may be carried out by the machinery or system including the controller in combination with the various sensors, actuators, and/or other hardware in combination with the electronic controller. As such, the described actions, operations, and/or functions may graphically represent code to be programmed into non-transitory memory of the computer readable storage medium in a system. The various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to vehicle systems that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric machine, comprising:
    a rotor assembly that includes:
        a rotor shaft;
        a stack of rotor laminations; and
        one or more nozzles designed to receive pressurized coolant from a rotor shaft coolant passage and deliver the coolant to a set of open coolant channels in the stack of rotor laminations,
        wherein the set of open coolant channels includes outlets that are profiled to direct the coolant towards a groove in a balancing plate that is coupled to rotor assembly,
        wherein the balancing plate includes a plurality of coolant conduits in fluidic communication with the groove that direct the coolant towards end windings of a stator of the electric machine, the plurality of coolant conduits in direct fluidic communication with the end windings so the coolant is unobstructedly directed to the end windings,
        wherein the set of open coolant channels includes at least one angular channel extending from the one or more nozzles to a plurality of axial coolant channels through the stack of rotor laminations, and
        wherein the at least one angular channel forms a non-perpendicular angle with the rotor shaft's rotational axis.

2. The electric machine of claim 1, wherein the groove circumferentially extends around the balancing plate.

3. The electric machine of claim 1, wherein the set of open coolant channels includes a plurality of radial channels extending from the one or more nozzles to a plurality of axial coolant channels in the stack of rotor laminations.

4. The electric machine of claim 1, wherein a number of the one or more angular channels is less than a number of axial coolant channels in the plurality of axial coolant channels.

5. The electric machine of claim 1, wherein the at least one angular channel is formed via a spacer positioned between two portions of the stack of rotor laminations.

6. The electric machine of claim 5, wherein one or more air passages extend axially through the stack of rotor laminations from one or more respective air passage intakes positioned at one or more axial sides of the stack of rotor laminations.

7. The electric machine of claim 6, wherein the one or more air passages are positioned radially inwards from a plurality of axial coolant channels of the set of open coolant channels.

8. The electric machine of claim 1, wherein the one or more nozzles are positioned in the rotor shaft.

9. The electric machine of claim 1, wherein the coolant is oil.

10. The electric machine of claim 1, wherein the plurality of coolant conduits are positioned at the outer edge of the axial coolant channels, radially in line with the balancing plate groove and axially in line with an outer section of the stack of rotor laminations, the outer section positioned in between the axial coolant channels and an air gap;
    wherein the plurality of coolant conduits are aligned to form a non-perpendicular angle with the axial coolant channels with respect to the rotor shaft's rotational axis; and
    wherein the plurality of coolant conduits are in direct fluidic communication with the balancing plate groove.

11. A method for operating an electric machine, comprising:

operating a pump to flow pressurized coolant through one or more nozzles into a set of open coolant channels in a stack of rotor laminations;

wherein the electric machine includes:
- a balancing plate coupled to the stack of rotor laminations and including a plurality of coolant channels that are in fluidic communication with a groove in the balancing plate;

directing air through openings in the balancing plate to the set of open coolant channels, wherein the air combines with the coolant in the set of open coolant channels in the stack of rotor laminations after the coolant exits the one or more nozzles; and directing the coolant from the set of open coolant channels to end windings of a stator of the electric machine, the set of open coolant channels in direct fluidic communication with the end windings so the coolant is unobstructedly directed to the end windings.

12. The method of claim 11, wherein at outlets of the one or more nozzles the coolant mixes with air and flows into a plurality of axial coolant channels that extend axially through the stack of rotor laminations.

13. The method of claim 11, wherein:
the set of open coolant channels include a plurality of radial coolant channels and a plurality of axial coolant channels; and
the plurality of axial coolant channels receive air from an interior cavity of the electric machine.

14. The method of claim 11, further comprising adjusting the flow of coolant from the pump based on electric machine operating conditions.

15. An electric machine, comprising:
a rotor assembly that includes:
 a rotor shaft;
 a stack of rotor laminations; and
 one or more nozzles designed to receive pressurized oil from a pump and deliver the oil to a set of open oil channels in the stack of rotor laminations to form a mixture of oil and air;

wherein the set of open oil channels includes outlets that are profiled to direct the oil towards a groove in a balancing plate that is coupled to the rotor assembly;

wherein the balancing plate includes a plurality of oil conduits in fluidic communication with the groove that direct the oil towards end windings of a stator of the electric machine, the plurality of oil conduits in direct fluidic communication with the end windings so the coolant is unobstructedly directed to the end windings;

wherein the set of open oil channels includes a plurality of angular oil channels that extend from the one or more nozzles to a plurality of axial oil channels through the stack of rotor laminations, and wherein the plurality of angular oil channels form non-perpendicular angles with the rotor shaft's rotational axis.

16. The electric machine of claim 15, wherein:
the set of open oil channels includes a plurality of radial channels extending from the one or more nozzles to a plurality of axial oil channels through the stack of rotor laminations; and
the plurality of axial oil channels receive air from a cavity in the electric machine.

17. The electric machine of claim 15, wherein the rotor assembly includes one or more air passages that extend through the stack of rotor laminations and open into one or more oil channels of the set of open oil channels downstream of the one or more nozzles and are positioned radially inward from a plurality of axial oil channels of the set of open oil channels.

18. The electric machine of claim 15, wherein a number of the plurality of angular oil channels is less than a number of the plurality of axial oil channels.

* * * * *